Jan. 13, 1925.
R. FERRY
TELEPHONIC CONVERSATION METER
Filed Jan. 6, 1921
1,522,814
3 Sheets-Sheet 1
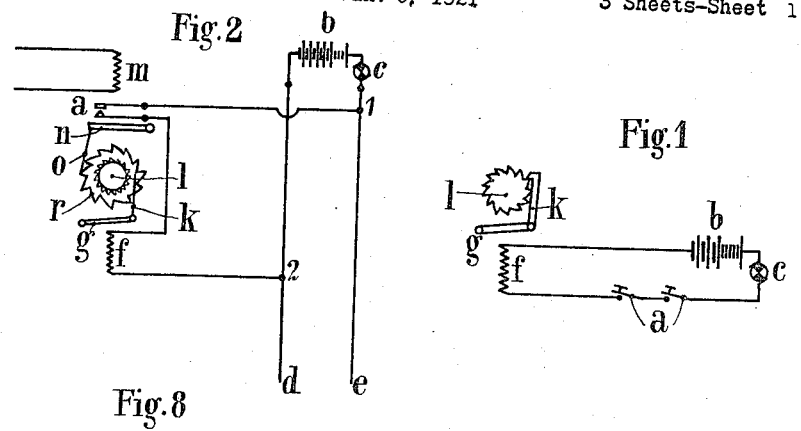
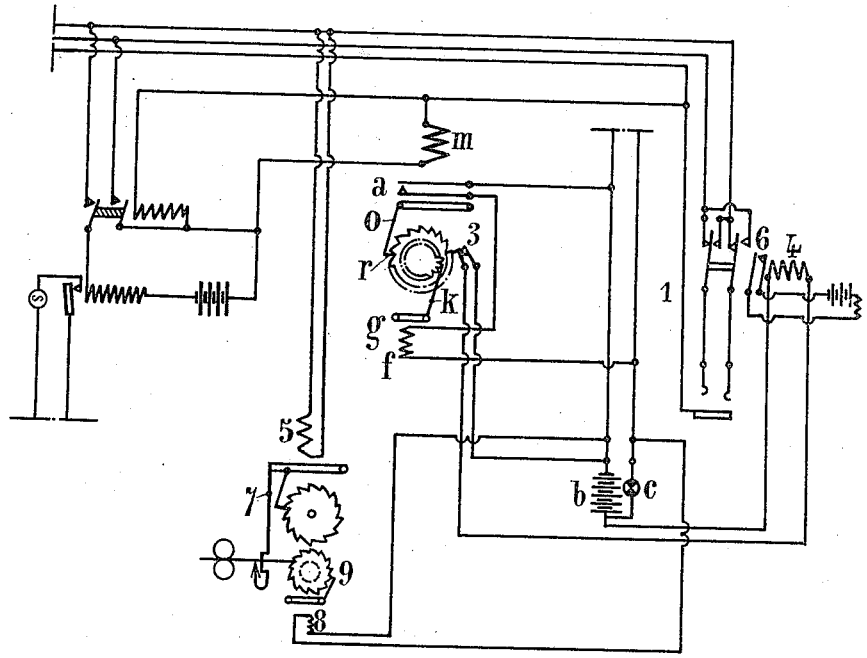
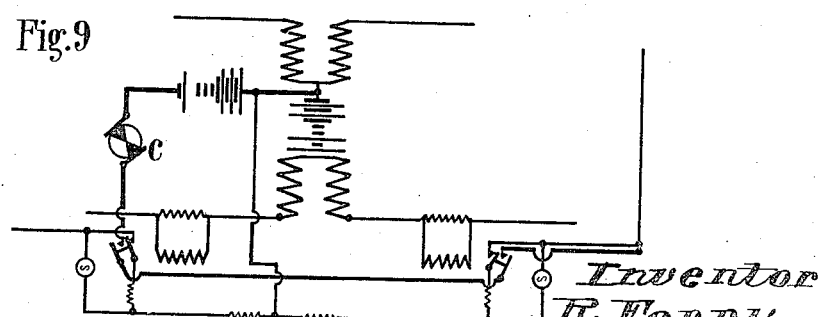
Inventor
R. Ferry,
By Marks & Clerk
Attys.

Jan. 13, 1925.

R. FERRY

TELEPHONIC CONVERSATION METER

Filed Jan. 6, 1921

Inventor
R. Ferry,
By Marks & Clark
Attys.

Jan. 13, 1925.  1,522,814

R. FERRY

TELEPHONIC CONVERSATION METER

Filed Jan. 6, 1921   3 Sheets-Sheet 3

Inventor
R. Ferry,
By Marks & Clerk
Attys

Patented Jan. 13, 1925.

1,522,814

UNITED STATES PATENT OFFICE.

ROBERT FERRY, OF PARIS, FRANCE.

TELEPHONIC CONVERSATION METER.

Application filed January 6, 1921. Serial No. 435,468.

*To all whom it may concern:*

Be it known that I, ROBERT FERRY, citizen of the French Republic, residing at Paris, France, have invented certain new and useful Improvements in Telephonic Conversation Meters, of which the following is a specification.

The present invention relates to a calculating mechanism which has been specifically constructed for making charges for telephonic conversations according to their number and duration. This apparatus is characterized essentially by the combination of two electromagnets, one of which controls the circuit of the other. One of these electromagnets is actuated at the beginning of the conversation to close a set of contacts to cause a variation of the current in the circuit of the calculating mechanism and to register a unit representing a conversation. This electromagnet closes the circuit with one connected with a periodic commutator in such manner that its armature receives periodical movements which operate a kinematic system. The course of the latter corresponds to a unit of conversation, so that when the kinematic system reaches this position at the end of its course, it acts in turn on the same contact which produce a variation of current in the calculating mechanism circuit, which marks a new unit of conversation. When the kinematic system arrives at the end of its course it may either undergo a new movement in the same direction or, on the contrary, be automatically withdrawn to its initial inoperative position through the action of a mechanism acting in opposition to the motive force operating the electromagnet which actuates it.

In the accompanying drawings, given by way of example only,

Figures 1 and 2 illustrate diagrammatically two conversation meter plants made in accordance with the features of this invention.

Figure 8 shows diagrammatically a meter plant for effecting the taxation at the subscriber's house.

Figure 9 shows another application thereof in case the taxation is to be effected only according to the duration of the conversation.

Figure 4:
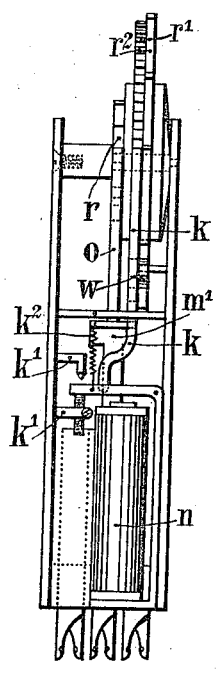
Figures 3, 4, 5 are an elevation and side views of a conversation meter.

The telephonic meter plant, forming the subject-matter of this invention, consists essentially in combining with the telephonic plant proper, a metering circuit (Fig. 1) which can be automatically closed and opened at the beginning and at the end of the conversation. For that purpose, the switch or switches $a$ can be automatically controlled (mechanically or electro-magnetically) by the supervision members. The circuit is branched to the terminals of a battery $b$ the direct current of which is transformed into pulsations by means of a periodically closing switch $c$.

In practice, the source of supply of direct current $b$ sends, through the medium of a periodically closing switch $c$, pulsations of current in bus-bars $d$, $e$. During the conversation, the switch $a$ is held closed as previously indicated, so that a closed circuit is established through $b$, $c$, 1, $a$, 2, $b$. Upon each pulsation of current, the electro-magnet $f$ connected to the circuit attracts its armature $g$ which, through a pawl and ratchet device $h$ drives, by intermittent actions equal in time, the wheel $l$ controlling the mechanism of the meter.

The switch $a$ of the metering circuit is, as previously mentioned, automatically controlled at the beginning and at the end of the conversation. In case an electro-magnetic driving device is used, there may be provided an electro-magnet $m$ acting on the said switch $a$ and receiving current as soon as the supervision members have operated.

If it is desired to tax the conversations, not only according to their duration, but also according to their number and duration, a pawl $o$ can be combined with the armature $n$ of the electro-magnet $m$, this pawl actuating a toothed wheel $r$ integral with the wheel $l$. The number of teeth of the wheels $l$, $r$, on the one hand, and the frequency of the pulsations in the controlling circuit of the meter, on the other hand, are combined in such a manner that the wheel $r$ rotates through an angle equal to the angle through which the wheel $l$ would have moved for one unit of conversation.

If we suppose, for instance, that the wheel $r$ has ten teeth, that the unit of time of conversation is 180 seconds and that the admitted approximation is 20 seconds corresponding to the period of the pulsations, the wheel $l$ must have $\frac{180}{20} = 9$ times the number of teeth of the wheel $r$. As the wheel $r$ has ten teeth the wheel $l$ must therefore be provided with ninety teeth.

When the conversation will be established, every 20 seconds the wheels $l$, $r$, will rotate through 1/90 of a revolution. After 210 seconds, the said wheels will have rotated through $\frac{210}{20} = 10$ teeth and the meter will have registered 1/10 of a revolution after the 180 seconds (unit of conversation) and 2/90 after the 200 seconds it will be in advance of 2/90 of a revolution. But when the following conversation takes place, the electro-magnet $m$ attracting its armature, will drive the wheel $l$ only to the extent of the complement of the angle corresponding to one tooth of the wheel $r$, so that the advance registered on the meter will not have any effect on the totalization.

For sending the current in the electromagnet $m$ during the entire duration of the conversation, it is possible to use any suitable device according to the characteristic features of the telephonic plant proper.

For the taxation according to the duration of the conversations, the above indicated arrangements may be adopted by doing away, as set forth, with the rod $o$ and the wheel $r$ (Fig. 2). The device shown in Fig. 1 can also be adopted.

It will be noted that the base of taxation can be altered by modifying the frequency of the pulsations which will be of any duration whatever. They even can be simply interruptions in the continuity of the current. A part of the circuits may be common with the circuits of the adjacent plants, particularly as far as the return of the current is concerned.

The electro-magnets $m$ and $f$ may be polarized or not.

Figure 3:
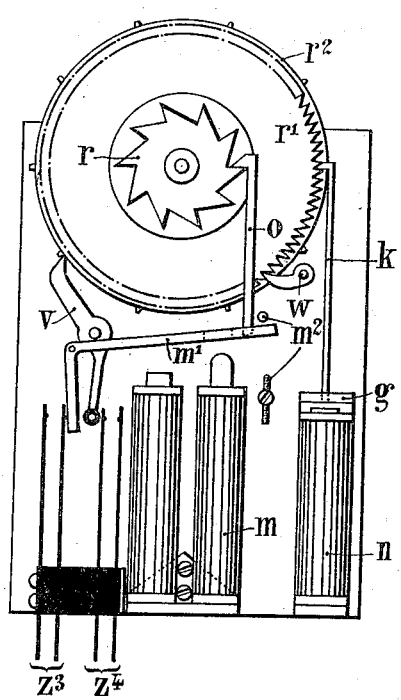
Figure 5:
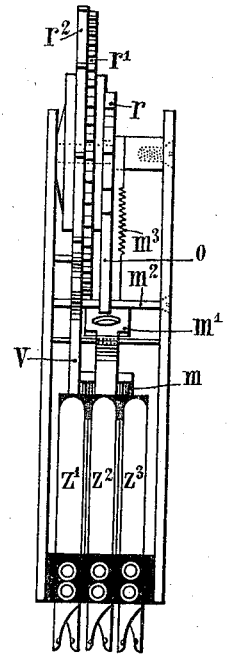

Figs. 3, 4, 5, illustrate constructional arrangements of meter adapted to be used as described in the foregoing.

In the meter device taxing the conversations according to their number and duration, there is provided an electro-magnet $m$ which attracts, during the entire duration of the conversation, an armature $m^1$. The displacement of the latter is limited between two abutments $m^2$ and the spring $m^3$ tends to bring it back in its initial position. The armature $m^1$ actuates, in its displacements, a pawl $o$ which acts on a wheel $r$ provided with ten teeth and integral with another $r^1$ having ninety teeth. In its position of attraction, the armature $m^1$ closes a series of contacts $z^1$, $z^2$, $z^3$.

During the entire duration of the conversation, pulsations of current are sent in the winding of the electro-magnet $n$ at regular intervals.

From this moment, each pulsation of current produces the attraction of the armature $g$ integral with the pawl $k$, thus causing the advance of a tooth of the wheel $r^1$. The displacement of the armature $k$ is limited by the double abutment $k^1$ and a spring $k^2$ acts upon the said armature to bring it back to its initial position. A pawl $w$ prevents any rearward movement. The wheels $r$, $r^1$ are secured on a common shaft to which they impart their movement. On this shaft is secured any indicating device whatever, or if the meter is arranged on the multiple cable of the starting groups, a third wheel $r^2$ is combined with the two wheels $r$, $r^1$, the third wheel being integral with these latter. The wheel $r^2$ is provided with peripheral bosses on which rubs a pawl $v$ which is successively raised at the passage of each of these bosses. The movement of the pawl $v$ is used for acting on a contact $z^4$ closing an auxiliary circuit which actuates the meter of the subscriber.

Each boss of the wheel $r^2$ is arranged in such a manner that it actuates the pawl $v$ for each unit of conversation which is to be taxed.

The electro-magnet $m$ is provided with any number whatever of windings and the latter may be, according to the requirements, magnetizing or demagnetizing windings.

Figure 6:
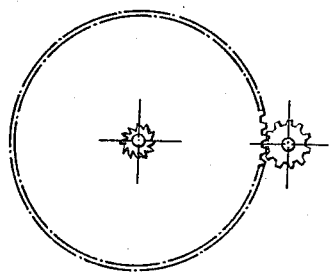
Figures 6 and 7 illustrate constructional modifications of a conversation meter.
Figure 7:
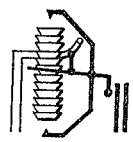

If the precision with which it is desired to tax the conversations necessitates the use of a wheel $r^1$ the number of teeth and the diameter of which are too great for a practical utilization, a multiplying system (Fig. 6) or a rack device (Fig. 7) might be adopted without modifying the principle forming the subject-matter of this invention.

The advance of this rack would be effected by means of a pawl controlled by the electro-magnet $n$.

When the unit of conversation will have elapsed, that is to say when the rack will be at the end of its travel, the following pulsation, owing to the advance of the said rack, will cause the operation of a joint which will release it from the two pawls and will close a contact. The rack will then move upward again until it strikes, by its opposite end, against an abutment which will replace the whole in its initial position.

The position of rest of the armature $m^1$ will also determine the resetting of the rack in its initial position.

For obtaining the counting at the subscriber's home, there is added to the telephonic plant previously described, a switch $l$ permitting to reverse the order of the wires, at the central telephonic station, and an ordinary meter, at the subscriber's home. This meter (Fig. 8) is arranged in shunt in the line and comprises an electro-magnet with polarized magnet. This magnet must not attract its armature as long as the current is normally sent in the line, but it operates when the current is reversed by the switch $l$. At each unit of conversation which is to be registered, the switch $l$ will therefore be actuated.

At each registration of an unit of conversation by the meter, the toothed wheel $r$ rotates to the extent of one tooth. The switch $l$ may therefore be controlled by the toothed wheel $r$ by mechanically connecting said switch by means of a rod which will bear on the teeth of the said wheel $r$ or on abutments suitably arranged on the latter. The switch $l$ may also be electrically controlled, as illustrated. It suffices to provide a contact 3 which is closed at the passage of each tooth of the wheel $r$ and which sends the current through the electro-magnet 4, the resulting attraction of the armature actuates the switch $l$.

It is to be noted that another meter with polarized electro-magnet 5 can be arranged at the central telephonic station, in shunt on the subscriber line, this meter operating in the same conditions as the meter arranged at the subscriber's home and giving concordant indications. In this case, it is a useless repetition with the mechanism directly actuated by the wheel $r$, so that this mechanism can be done away with. In fact, the electromagnet $f$ and its toothed wheels $l$, $r$, instead of mechanically controlling the meter, will electrically actuate a certain number of mechanisms. The meter can also be actuated, at the central telephonic station, by closing the contact 3 arranged on the circuit controlling the switch $l$, thus avoiding of branching two shunt lines on the subscriber line.

With the armature of each meter, at the central telephonic station, may also be combined a rod 7 provided with a stylus impressing a strip of paper. At each end, the strip of paper is moved by an electro-magnet 8 which constantly receives pulsations of current so as to actuate the wheel 9 of the winding device.

Figure 10:
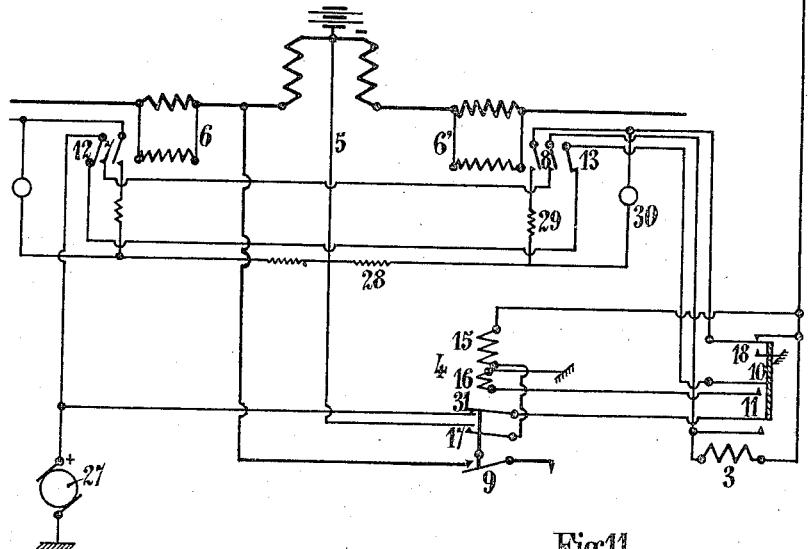
Figures 10 and 11 illustrate the application of this process to a plant, the meter being arranged, on the one hand, near the call members of the subscriber and, on the other hand, on the multiple core cable.
Figure 11:
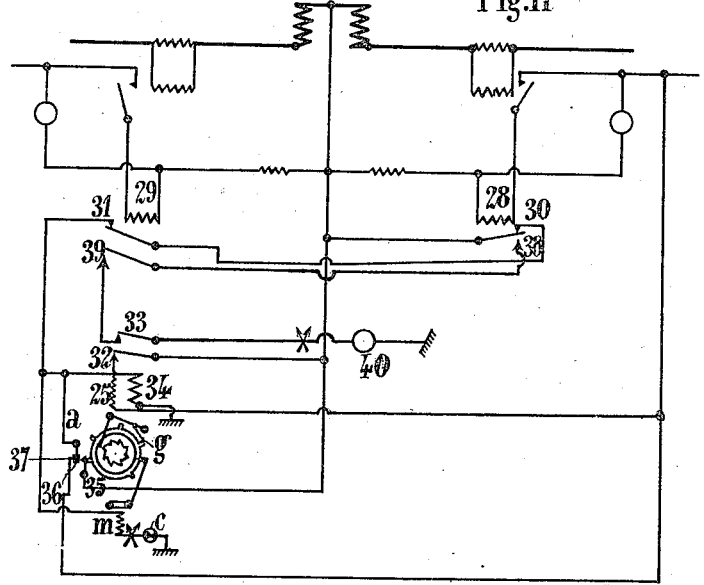

The diagrams shown in Figs. 10 and 11 are adapted to obtain the taxation during the entire duration of the conversation, the meter being able to register only one conversation per plug inserting operation.

For that purpose, to the normal plant are added several auxiliary circuits and the relays 3, 4; the supply of current under less than 24 volts is effected through the wire 5 and under 12 volts through the positive pole of the dynamo 27.

When at rest, the wires branched on the dynamo 27 lead to open circuits.

When the plug is inserted in the jack of the caller (right-hand side of Fig. 10) the working of the supervision members is normally effected; the same is true when the plug is inserted in the jack of the person called for and when the calling current is sent on.

The disconnecting relay 26 operates normally, but the polarization of the electro-magnet of the meter 25 will be suitably chosen for preventing the electro-magnet from working under the action of the current directed in that direction.

As soon as the person called for unhooks the receiver the supervision relay 6 operates. A circuit is closed through the ground, the dynamo 27, 7, 8, 3, the polarized electro-magnet of the meter 25, the disconnecting relay 26 and the ground. At this moment, the windings of the disconnecting relay 26 and of the meter 25 will be traversed by a current the direction of which is reverse to that of the current they previously received. The meter 25 operates. The resistances of 25, 26 and 3, on the one hand and the electromotive force of the dynamo 27, on the other hand, will be combined so that the current passing through the windings of the relay 26 and meter 25 will have intensity in both directions.

It has been stated that the current of 12 volts coming from the dynamo 27 and passing through 7, 8, 3, 25, 26 and the ground will determine the operation of the relay 3, the contact 18 will be closed through the ground. On the other hand, the contact 11 will close the circuit 11, 31, at the terminals of the dynamo 27, thus short-circuiting the contacts 7 and 8 and causing the relay 3 to stick. The subscribers will therefore be able to manipulate the switch-hook of their apparatus without affecting the meter. However, when the position of end of conversation will be taken, that is to say when the two subscribers will hang up the receiver, a circuit will be closed through the dynamo 27, 12, 13, 10, 16 and the ground. It is to be noted that this circuit can be closed only if the relay 3 has operated, that is to say if the conversation has taken place. The relay 4 operates. Through the contact 31, the supply of current to the relay 3 is cut off and through 17, 15, the third wire, the meter 25 and the disconnecting relay 26, the direction of the current will be altered. The meter 25 will therefore cease to work.

Provisions will be made so that the contact 17 closed before the contact 31 is open. The relay 4 will be locked until the operator has taken off her reply plug. A line wire will be shunted through the contact 9 on a special circuit comprising, for instance, a buzzer which will prevent any non-taxed conversation.

As soon as the operator has taken off her plugs, the whole comes back to rest, that is to say to the initial waiting position.

The diagram of Fig. 11 relates to the application of the meter on the starting multiple core cable.

When the caller and the person called for have unhooked their receivers, the relays 28 and 29 operate and a circuit is closed through −24 volts, the contacts 30, 31, the winding 34 of the meter and the ground. The armature $g$ of the meter 34 is attracted and the contacts 32 and 33 are closed. Through −24 volts, the contact 32, the winding 25 of the meter, the third wire and the ground, a circuit is closed which holds the armature $g$ in its attracted position until the plug of the collar is taken off. Through −24 volts, the contacts 30, 31, the winding $m$ of the electro-magnet, the interrupter $c$ and the ground a circuit is closed at intervals. The passage of the pulsations of current in the electro-magnet $m$ causes the wheels of the meter to rotate. If one of the subscribers hangs up his receiver, the corresponding contact 30 or 31 opens and the electro-magnet $m$ being no longer energized will not act any more on the meter. The taxation according to the duration of the conversation will no longer be effected.

At each passage of a unit of conversation, the trip gear $a$ operates and the contact 35 presses on the contacts 36, 37 thus closing two circuits. The first circuit, through −24 volts the contacts 35, 36, 37, the third wire, will determine the operation either of an ordinary meter, normally arranged, or of a relay producing a reversal of current adapted to actuate the meter of the subscriber, or any other suitable device.

The second circuit, through −24 volts, the contacts 35, 36 the winding 34 of the meter and the ground, will hold the armature $g$ stuck. This latter arrangement is adapted to prevent the inconvenience resulting from the fact that, during the sending of the pulsations of current on the third wire, the windings of the relay 28 and of the meter 25 would not receive any current owing to the opposition of the currents.

To this device may be easily added a special circuit adapted to supply a pilot lamp indicating the end of the conversation, this circuit would pass through −24 volts, the contacts 38, 39, 33, the pilot lamp 40 and the ground.

What I claim as my invention and desire to secure by Letters Patent is:

1. In a telephonic conversation meter for non-automatic central installation, an electro-magnet, a supervising relay, said electro-magnet being arranged to be automatically connected in circuit with a local battery by the operation of said supervising relay when two subscribers have unhooked their receivers, an armature associated with said electro-magnet, a ratchet wheel actuated by said armature, a toothed wheel integral with said ratchet wheel, the number of teeth on said toothed wheel being a multiple of the number of teeth of the ratchet wheel, a wheel integral with the first mentioned wheels, bosses on the last mentioned wheel, the positions of which correspond with those of the teeth of the ratchet wheel, an oscillating member coacting with said bosses, a meter-registering circuit, and contact plates interposed in said circuit and actuated by said oscillating member.

2. In a telephonic conversation meter for non-automatic central installation, an electro-magnet, a supervising relay, said electro-magnet being arranged to be automatically connected in circuit with a local battery by the operation of said supervising relay when two subscribers have unhooked their receivers, an armature associated with said electro-magnet, a ratchet wheel actuated by said armature, a toothed wheel integral with said ratchet wheel, the number of teeth on said toothed wheel being a multiple of the number of teeth of the ratchet wheel, a wheel integral with the first mentioned wheels, bosses on the last mentioned wheel, the positions of which correspond with those of the teeth of the ratchet wheel, an oscillating member coacting with said bosses, a meter-registering circuit, contact plates interposed in said circuit and actuated by said oscillating member to register a unit at the beginning of conversation, and means to then actuate said meter register periodically.

3. In a telephonic conversation meter for non-automatic central installation, an electro-magnet, a supervising relay, said electro-magnet being arranged to be automatically connected in circuit with a local battery by the operation of said supervising relay when two subscribers have unhooked their receivers, an armature associated with said electro-magnet, a ratchet wheel actuated by said armature, a toothed wheel integral with said ratchet wheel, the number of teeth on said toothed wheel being a multiple of the number of teeth of the ratchet wheel, a wheel integral with the first mentioned wheels, bosses on the last mentioned wheel, the positions of which correspond with those of the teeth of the ratchet wheel, an oscillating member coacting with said bosses, a meter-registering circuit, contact plates interposed in said circuit and actuated by said oscillating member, to register a unit at the beginning of conversation, a meter circuit, a lever integral with the armature of said electro-magnet, a set of contact plates actuated by said lever to close said meter circuit during the entire duration of the conversation, and means to periodically produce current pulsations in said meter register circuit.

4. In a telephonic conversation meter for non-automatic central installation, an electro-magnet, supervising relays, said electro-magnet arranged to be automatically connected in circuit with a local battery by the operation of said supervising relays when two subscribers have unhooked their receivers, an armature for said electro-magnet, a ratchet wheel actuated by said armature, a toothed pinion integral with said ratchet wheel, the number of teeth of said pinion being a multiple of that of the teeth of the ratchet wheel, a drum integral with said pinion, peripheral bosses on said drum, the positions of which correspond to the teeth on the ratchet wheel, a meter register circuit, contact plates interposed in said circuit, an oscillating lever cooperating with said bosses to actuate said contact plates, a lever carried by the armature of the electro-magnet, a set of contacts actuated by said armature carried lever, said set of contacts being adapted to be held in closed position by said armature carried lever throughout the entire conversation, a commutator in said circuit, a second electro-magnet, an armature associated with said electro-magnet and coacting with said pinion to periodically advance the latter incident to the successive moments of energization of the second mentioned electro-magnet, said drum being advanced with said pinion whereby to actuate said oscillating lever, and means to periodically produce current pulsations in said circuit, a periodic commutator in said circuit, and an electric motor periodically excited by said commutator.

5. In a telephonic conversation meter for non-automatic central installation, an electro-magnet, supervising relays, said electro-magnet arranged to be automatically connected in circuit with a local battery by the operation of said supervising relays when two subscribers have unhooked their receivers, an armature for said electro-magnet, a ratchet wheel actuated by said armature, a toothed pinion integral with said ratchet wheel, the number of teeth of said pinion being a multiple of that of the teeth of the ratchet wheel, a drum integral with said pinion, peripheral bosses on said drum, the positions of which correspond to the teeth on the ratchet wheel, a meter register circuit, contact plates interposed in said circuit, an oscillating lever cooperating with said bosses to actuate said contact plates, a lever carried by the armature of the electro-magnet, a set of contacts actuated by said armature carried lever, said set of contacts being adapted to be held in closed position by said armature carried lever throughout the entire conversation, a commutator in said circuit, a second electro-magnet, an armature associated with said electro-magnet and coacting with said pinion to periodically advance the latter incident to the successive moments of energization of the second mentioned electro-magnet, said drum being advanced with said pinion whereby to actuate said oscillating lever, and means to periodically produce current pulsations in said circuit, a periodic commutator in said circuit, an electric motor periodically excited by said commutator, and means to automatically return the entire mechanism to its inoperative position after a predetermined angular movement of the ratchet wheel.

6. In a telephonic conversation meter for non-automatic central installation, an electro-magnet, supervising relays, said electro-magnet arranged to be automatically connected in circuit with a local battery by the operation of said supervising relays when two subscribers have unhooked their receivers, an armature for said electro-magnet, a ratchet wheel actuated by said armature, a toothed pinion integral with said ratchet wheel, the number of teeth of said pinion being a multiple of that of the teeth of the ratchet wheel, a drum integral with said pinion, peripheral bosses on said drum, the positions of which correspond to the teeth on the ratchet wheel, a meter register circuit, contact plates interposed in said circuit, an oscillating lever cooperating with said bosses to actuate said contact plates, a lever carried by the armature of the electro-magnet, a set of contacts actuated by said armature carried lever, said set of contacts being adapted to be held in closed position by said armature carried lever throughout the entire conversation, a commutator in said circuit, a second electro-magnet, an armature associated with said electro-magnet and coacting with said pinion to periodically advance the latter incident to the successive moments of energization of the second mentioned electro-magnet, said drum being advanced with said pinion whereby to actuate said oscillating lever, means to periodically produce current pulsations in said circuit, a periodic commutator in said circuit, an electric motor periodically excited by said commutator, and spring means arranged on the axis of the pinion and ratchet wheel and subjected to tension during the angular movement of said pinion, a stop pawl cooperating with the pinion, and means for releasing said pawl and for interrupting the operation of the mechanism at a predetermined stage.

7. In a telephonic conversation meter for non-automatic central installation, an electro-magnet, supervising relays, said electro-magnet arranged to be automatically connected in circuit with a local battery by the operation of said supervising relays when two subscribers have unhooked their receivers, an armature for said electro-magnet, a ratchet wheel actuated by said armature, a toothed pinion integral with said ratchet wheel, the number of teeth of said pinion being a multiple of that of the teeth of the ratchet wheel, a drum integral with said pinion, peripheral bosses on said drum, the positions of which correspond to the teeth on the ratchet wheel, a meter register circuit, contact plates interposed in said circuit, an oscillating lever cooperating with said bosses to actuate said contact plates, a lever carried by the armature of the electro-magnet, a set of contacts actuated by said armature carried lever, said set of contacts being adapted to be held in closed position by said armature carried lever throughout the entire conversation, a commutator in said circuit, a second electro-magnet, an armature associated with said electro-magnet and coacting with said pinion to periodically advance the latter incident to the successive moments of energization of the second mentioned electro-magnet, said drum being advanced with said pinion whereby to actuate said oscillating lever, means to periodically produce current pulsations in said circuit, a periodic commutator in said circuit, an electric motor periodically excited by said commutator, and spring means arranged on the axis of the ratchet wheel and pinion adapted to be subjected to tension during the movement of the pinion, a stop pawl cooperating with the pinion, a stop lug arranged to actuate said pawl and release the mechanism subject to the action of withdrawal of the spring and to return the armature of the first mentioned electro-magnet to interrupt the circuit of the second mentioned electro-magnet.

8. In a telephonic conversation meter for non-automatic central installation, an electro-magnet, supervising relays, said electro-magnet arranged to be automatically connected in circuit with a local battery by the operation of said supervising relays when two subscribers have unhooked their receivers, an armature for said electro-magnet, a ratchet wheel actuated by said armature, a toothed pinion integral with said ratchet wheel, the number of teeth of said pinion being a multiple of that of the teeth of the ratchet wheel, a drum integral with said pinion, peripheral bosses on said drum, the positions of which correspond to the teeth on the ratchet wheel, a meter register circuit, contact plates interposed in said circuit, an oscillating lever cooperating with said bosses to actuate said contact plates, a lever carried by the armature of the electro-magnet, a set of contacts actuated by said armature carried lever, said set of contacts being adapted to be held in closed position by said armature carried lever throughout the entire conversation, a commutator in said circuit, a second electro-magnet, an armature associated with said electro-magnet and coacting with said pinion to periodically advance the latter incident to the successive moments of energization of the second mentioned electro-magnet, said drum being advanced with said pinion whereby to actuate said oscillating lever, means to periodically produce current pulsations in said circuit, a periodic commutator in said circuit, an electric motor periodically excited by said commutator, and spring means arranged on the axis of the ratchet wheel and pinion adapted to be subjected to tension during the movement of the pinion, a stop pawl cooperating with the pinion, a stop lug arranged to actuate said pawl and release the mechanism subject to the action of withdrawal of the spring and to return the armature of the first mentioned electro-magnet to interrupt the circuit of the second mentioned electro-magnet, and means for registering at a central station the indications transmitted to the subscriber's meter register.

9. An apparatus as claimed in claim 7 characterized by the provision of a set of contacts co-acting with the bosses of the drum to close the circuit, a relay in said circuit for periodically reversing the wires of the line, a shunt circuit on the line wires to excite an electro-magnet, an armature for said electro-magnet to actuate a ratchet wheel, a stylus actuated by said armature, a register controlled by said ratchet wheel, and means to automatically unwind a strip of registering paper in front of the stylus.

10. An apparatus as claimed in claim 7 characterized by the provision of a set of contacts co-acting with the bosses of the drum to close the circuit, a relay in said circuit for periodically reversing the wires of the line, a shunt circuit on the line wires to excite an electro-magnet, an armature for said electro-magnet to actuate a ratchet wheel, a stylus actuated by said armature, a register controlled by said ratchet wheel, and means to automatically unwind a strip of registering paper by means of an electro-magnet in circuit with the periodic commutator.

In testimony whereof I have signed my name to this specification.

ROBERT FERRY.